US011104506B2

(12) United States Patent
Maguire et al.

(10) Patent No.: US 11,104,506 B2
(45) Date of Patent: Aug. 31, 2021

(54) DISPENSING APPARATUS

(71) Applicant: Rocep Lusol Holdings Ltd., Glasgow (GB)

(72) Inventors: Jordan Maguire, Glasgow (GB); Bernard Frutin, Glasgow (GB)

(73) Assignee: Rocep Lusol Holdings Ltd., Glasgow (GB)

( * ) Notice: Subject to any disclaimer, the term of this patent is extended or adjusted under 35 U.S.C. 154(b) by 0 days.

(21) Appl. No.: 16/632,153

(22) PCT Filed: Jul. 16, 2018

(86) PCT No.: PCT/GB2018/052010
§ 371 (c)(1),
(2) Date: Jan. 17, 2020

(87) PCT Pub. No.: WO2019/016527
PCT Pub. Date: Jan. 24, 2019

(65) Prior Publication Data
US 2020/0231368 A1     Jul. 23, 2020

(30) Foreign Application Priority Data

Jul. 17, 2017  (GB) .................................. 1711476.0
Jun. 14, 2018  (GB) .................................. 1809774.1

(51) Int. Cl.
*B65D 83/14*     (2006.01)
*B65D 83/20*     (2006.01)
(Continued)

(52) U.S. Cl.
CPC ........... *B65D 83/64* (2013.01); *B65D 83/201* (2013.01); *B65D 83/44* (2013.01); *B65D 83/752* (2013.01); *Y02W 90/10* (2015.05)

(58) Field of Classification Search
CPC ...... B65D 83/64; B65D 83/201; B65D 83/44; B65D 83/752; Y02W 90/10
See application file for complete search history.

(56) References Cited

U.S. PATENT DOCUMENTS 4,685,597 A     8/1987   Hirao et al.
4,826,054 A *   5/1989   Frutin .................. B65D 83/201
                                          222/402.11
(Continued)

FOREIGN PATENT DOCUMENTS

AU    200191419 A1   1/2002
WO      9918010 A2   4/1999

OTHER PUBLICATIONS

International Search Report for PCT/GB2018/052010, dated Oct. 17, 2018, 5 pages.
Written Opinion for PCT/GB2018/052010, dated Oct. 17, 2018, 6 pages.

*Primary Examiner* — Frederick C Nicolas
(74) *Attorney, Agent, or Firm* — Faegre Drinker Biddle & Reath LLP

(57) ABSTRACT

A pressure pack dispenser (100) for dispensing a product comprises a cylindrical container (401) with a product outlet through which the product is dispensed, a composite piston (408) movably mounted within the container, and a pressurised propellant. The composite piston comprises a first upper piston (409A) coupled to a second lower piston (409B) to permit limited relative axial movement and a viscous sealant material (410) located between the first and second pistons. The propellant comprises a compressed gas which remains in the gaseous phase as the piston (408) moves from a first full position to a second exhausted position, or a mixture of a liquid propellant and a compressed gas selected such that in the full position the mixture is at a pressure greater than the vapour pressure of the liquid propellant. A clearance is provided between the second (Continued)

lower piston (409B) and the container wall (401A) which is filled with the sealant (410) as the composite piston moves to expel product. The viscosity of the sealant and clearance are selected such that a thin film of viscous sealant material (410A) is left on the container wall of the propellant chamber, thereby reducing friction between the composite piston (408) and the container wall (401A). The sealant (410) preferably comprises a mixture of glycerine and starch, and has a viscosity of less than 100 poise and less than 4000 poise at 20° C.

26 Claims, 7 Drawing Sheets

(51) Int. Cl.
  *B65D 83/44* (2006.01)
  *B65D 83/64* (2006.01)

(56) References Cited

U.S. PATENT DOCUMENTS

| | | | |
|---|---|---|---|
| 5,507,420 A | 4/1996 | O'Neill | |
| 6,152,335 A * | 11/2000 | Stern | B05B 1/02 222/394 |
| 6,321,951 B1 * | 11/2001 | Frutin | B65D 83/201 222/389 |
| 6,474,510 B2 | 11/2002 | Frutin | |
| 6,685,064 B2 * | 2/2004 | Frutin | B65D 83/201 222/153.12 |
| 7,641,079 B2 * | 1/2010 | Lott | B65D 83/22 222/402.13 |
| 8,240,509 B2 | 8/2012 | Geiger | |
| 10,640,282 B2 * | 5/2020 | Ehrensperger | B65D 83/22 |
| 2013/0168413 A1 | 7/2013 | Bodet et al. | |
| 2015/0028053 A1 | 1/2015 | Tryon | |

* cited by examiner

DISPENSING APPARATUS

This invention relates to a pressure pack dispenser. Particularly, but not exclusively it relates to a pressure pack dispenser for dispensing viscous materials from a container under pressure of a propellant.

A pressure pack dispenser is known from WO 99/18010. This dispenser includes a valve mechanism fitted to a container which is refilled with a product, for example mastic or sealant, which is to be dispensed. A liquid propellant is provided in the container below a composite piston. Above the composite piston is the product to be dispensed, which can be introduced into the container by filling through the valve aperture. The liquid propellant is pressurised and "boils" at a low temperature, so that as the composite piston rises up the container and product is dispensed through the valve upon operation of the operating lever to open the valve, the pressure in the volume of the container below the composite piston remains substantially constant.

The dispenser suffers from the disadvantage that the use of hydrocarbon-based liquid propellants such as HFC-134a or 1,1,1,2-tetrafluoroethane is being discouraged, as a result of environmental concerns. There is therefore a requirement to provide a pressure pack dispenser which can be filled as easily as the known dispenser, and which can be operated simply by operation of a lever to open the dispensing valve, but which minimises or eliminates avoids the use of fluorinated or other hydrocarbon liquid propellants.

According to a first aspect of the invention there is provided a pressure pack dispenser for dispensing a product comprising:
 a container for dispensing a product therefrom, the container comprising a cylindrical container wall, a lower end wall, and a product outlet through which the product is dispensed, and
 a composite piston movably mounted within the container and adapted to move from a first position adjacent the lower end wall to a second position adjacent the outlet,
 the composite piston comprising a first upper piston, a second lower piston and a coupling means, the coupling means movably coupling the first and second pistons to each other and permitting limited relative axial movement between the first and second pistons, the axial movement being in a substantially longitudinal direction parallel to the direction of movement of the composite piston,
 the container wall and the first upper piston defining a product chamber within the container, whereby movement of the composite piston within the container towards the outlet expels product through the outlet,
 the container wall and the second lower piston defining a propellant chamber containing a pressurised propellant,
 wherein the composite piston comprises a viscous sealant material located in a piston sealant chamber between the first and second pistons and adapted to be forced into engagement with the container wall by a compression force which acts between the first and second pistons to cause the second piston to move towards the first piston,
 wherein the pressurised propellant comprises a compressed gas which remains in the gaseous phase as the piston moves from the first position to the second position, and
 a clearance is provided between the second lower piston and the container wall which is filled with the viscous sealant material during movement of the composite piston within the container towards the outlet, the viscosity of the viscous sealant material and clearance being selected such that a thin film of viscous sealant material is left on the container wall of the propellant chamber as the composite piston moves within the container towards the outlet, thereby reducing the volume of viscous sealant material in the piston sealant chamber and reducing the friction force between the composite piston and the container wall.

The thin film of viscous sealant serves to lubricate the composite piston so that it can slide more easily along the container wall. As the composite piston moves up the wall leaving the thin film of sealant on the container wall, so the volume of sealant in the composite piston reduces, thereby reducing the overall height of the composite piston and reducing the contact area of the composite piston with the container wall, thereby further reducing the friction force. This reduced friction force compensates in part for any reduction in pressure of the compressed gas propellant, so that the product can continue to be dispensed at a constant or near-constant rate.

The pressurised propellant may comprise only a compressed gas which remains in the gaseous phase as the piston moves from the first position to the second position. This reduces the cost of the pressure pack dispenser, since it avoids the use of relatively expensive liquid propellant.

Alternatively the pressurised propellant may comprise a mixture of a compressed gas which remains in the gaseous phase as the piston moves from the first position to the second position and a liquid propellant. This also reduces the cost of the pressure pack dispenser, since it reduces the volume of liquid propellant compared to a pack in which only liquid propellant is used, but it offers the advantage of a minimum pressure in the propellant chamber equal to the vapour pressure of the liquid propellant, if sufficient liquid propellant is used.

The compressed gas may be selected from air, nitrogen, nitrous oxide and carbon dioxide or any other suitable gas. Such gases offer the advantage of being relatively inexpensive compared to liquid propellants such as hydrocarbons, while reducing environmental impact.

Preferably the first position of the composite piston is a full position in which the composite piston is at a position furthest from the outlet and the product chamber has its greatest volume, and the second position of the composite piston is an exhausted position in which the composite piston is at a position closest to the outlet and the propellant chamber has its greatest volume.

Preferably the second piston is adapted to move towards the first piston as the composite piston moves within the container towards the outlet. This allows the volume of the composite piston to be reduced as a thin film of sealant is extruded from the composite piston onto the container wall.

According to a second aspect of the invention there is provided a pressure pack dispenser for dispensing a product comprising:
 a container for dispensing a product therefrom, the container comprising a cylindrical container wall, a lower end wall, and a product outlet through which the product is dispensed, and
 a composite piston movably mounted within the container and adapted to move from a first position adjacent the lower end wall to a second position adjacent the outlet,
 the composite piston comprising a first upper piston, a second lower piston and a coupling means, the coupling means movably coupling the first and second pistons to each other and permitting limited relative axial movement between the first and second pistons, the axial movement being in a substantially longitudinal direction parallel to the direction of movement of the composite piston, the container wall and the first upper piston defining a product chamber within the container, whereby movement of the composite piston within the container towards the outlet expels product through the outlet, the container wall and the second lower piston defining a propellant chamber containing a pressurised propellant, wherein the composite piston comprises a viscous sealant material located in a piston sealant chamber between the first and second pistons and adapted to be forced into engagement with the container wall by a compression force which acts between the first and second pistons to cause the second piston to move towards the first piston, wherein the composite piston is arranged to travel from a first full position when the composite piston is at a position furthest from the outlet and the product chamber has its greatest volume to a second exhausted position when the composite piston is at a position closest to the outlet and the propellant chamber has its greatest volume.

wherein the pressurised propellant is a mixture of a liquid propellant and a compressed gas, and in the first full position the mixture of a liquid propellant and a compressed gas are at a pressure greater than the vapour pressure of the liquid propellant.

Using a mixture of a liquid propellant and compressed gas reduces the cost and environmental footprint of the propellant compared to only using a liquid propellant. The compressed gas is compressed to a pressure greater than the vapour pressure of the liquid propellant so that the initial movement of the composite piston from the first full position is achieved by a relatively high propellant pressure. As the composite piston moves towards the outlet, the volume of the propellant chamber increases, thereby reducing the pressure of the compressed gas, until the pressure is reduced to the vapour pressure of the liquid propellant. From that point the pressure in the propellant chamber remains at the vapour pressure as the composite piston continues to move towards the outlet.

Preferably in the second exhausted position the mixture of a liquid propellant and a compressed gas are at a pressure equal to the vapour pressure of the liquid propellant.

The liquid propellant may be a hydrocarbon, in particular a fluorinated hydrocarbon. The liquid propellant may have a vapour pressure in the range 2.0 Bar to 7.0 Bar (29 to 101 psi) at 20° C., preferably below 5.1 Bar (75 psi). Such a range avoids the fluorinated hydrocarbons of most concern to the environment.

The compressed gas may be selected from air, nitrogen, nitrous oxide and carbon dioxide. Such gases offer the advantage of being relatively inexpensive compared to liquid propellants such as hydrocarbons, while reducing environmental impact.

The liquid propellant may be selected from any suitable hydrocarbon, for example a fluorinated hydrocarbon such as 1234ZE (1,3,3,3-Tetrafluoropropene), 134a (1,1,1,2-Tetrafluoroethane), HFC-227 (1,1,1,2,3,3,3-Heptafluoropropane) or DuPont™ DYMEL® A propellant (methyl ether).

The invention makes possible the use of much less fluorinated hydrocarbon or other liquid propellant than in the prior art dispensing apparatus.

According to a third aspect of the invention there is provided a pressure pack dispenser for dispensing a product comprising:

a container for dispensing a product therefrom, the container comprising a cylindrical container wall, a lower end wall, and a product outlet through which the product is dispensed, and a composite piston movably mounted within the container and adapted to move from a first position adjacent the lower end wall to a second position adjacent the outlet, the composite piston comprising a first upper piston, a second lower piston and a coupling means, the coupling means movably coupling the first and second pistons to each other and permitting limited relative axial movement between the first and second pistons, the axial movement being in a substantially longitudinal direction parallel to the direction of movement of the composite piston, the container wall and the first upper piston defining a product chamber within the container, whereby movement of the composite piston within the container towards the outlet expels product through the outlet, the container wall and the second lower piston defining a propellant chamber containing a pressurised propellant, wherein the composite piston comprises a viscous sealant material located in a piston sealant chamber between the first and second pistons and adapted to be forced into engagement with the container wall by a compression force which acts between the first and second pistons to cause the second piston to move towards the first piston, characterised in that:

the pressurised propellant comprises a compressed gas which remains in the gaseous phase as the piston moves from the first position to the second position, the viscous sealant material comprises a mixture of glycerine or an equivalent liquid barrier material and starch or an equivalent filler material, the viscous sealant material has a viscosity of less than 100 poise, preferably less than 50 poise, at 100° C., and the viscous sealant material has a viscosity of less than 4000 poise, preferably less than 2000 poise, at 20° C.

The particular viscosity properties of the sealant allow the composite piston to move at a normal operating temperature of 20° C. to dispense product effectively under the relatively low propellant pressures achieved when the propellant is a compressed gas and the piston is near the second position, i.e. near the exhausted position, while providing a sufficiently low viscosity during assembly of the piston at the assembly temperature of 100° C. The assembly temperature is chosen to be high enough to soften the sealant, but not too high to damage the components of the piston, which are generally of plastic material.

The viscous sealant material may comprise between 40% and 90% glycerine by mass and between 10% and 60% starch by mass, preferably between 50% and 85% glycerine by mass and between 15% and 50% starch by mass. These particular materials and mass ratio achieve a composite piston which seals effectively but with relatively low friction, and which allows a thin film of sealant to be left on the container wall to lubricate the piston.

The pressurised propellant may comprise only a compressed gas which remains in the gaseous phase as the piston moves from the first position to the second position. Alternatively the pressurised propellant may comprise a mixture of a compressed gas which remains in the gaseous phase as the piston moves from the first position to the second position and a liquid propellant. Both compositions reduce the cost of the propellant compared to a liquid propellant only.

The compressed gas may be selected from air, nitrogen, nitrous oxide and carbon dioxide, or any other suitable gas which remains in the gaseous phase at the pressures required for dispensing the product. Typically the starting pressure of the gas, when the composite piston is in the full position, may be up to 15 Bar (217 psi).

The viscous sealant material may have a viscosity of less than 20 poise at 100° C., and less than 30 poise at 90° C.

The viscous sealant material may have a viscosity of between 800 and 3500 poise at 20° C.

The viscosity of the viscous sealant material may be between 500 and 700 Poise at 40° C. The glycerine to starch ratio may be between 50:50 and 60:40 by mass.

Preferably when the composite piston is in the exhausted position the pressurised gas is at a pressure which is substantially less than the pressure of the gas when the composite piston is in the full position, typically less than one third of the pressure of the gas when the composite piston is in the full position.

Preferably the piston sealant chamber is open circumferentially.

Preferably the coupling means comprises a projection on one of the first and second pistons which engages with a recess in the other of the first and second pistons to couple the first and second pistons together.

Preferably the projection is a central projection projecting in the longitudinal direction from one of the first and second pistons.

Preferably the recess is a central aperture provided in the other of the first and second pistons.

Typically, the projection is of a smaller lateral dimension than the recess to permit movement of the projection within the recess to facilitate the limited relative movement of the first and second pistons.

Typically, the projection and the recess include mutually engageable ratchet formations which permit movement of the pistons relative to each other in one direction only. Preferably, the one direction is movement of the pistons towards each other.

Typically, the first piston and/or the second piston may be elastically distorted to permit a push fit engagement of the projection into the recess.

Typically, the pistons may be manufactured from a flexible material, such as plastic.

Preferably, the second lower piston is provided with a spacer member which projects towards the lower end wall and when the composite piston is in the full position serves to space the composite piston from the lower end wall to provide a minimum volume of the propellant chamber. Typically the minimum volume of the propellant chamber is at least 10% of the maximum volume of the propellant chamber, the maximum volume occurring when the composite piston is in the exhausted position. For example the volume of the propellant chamber may be about 30 ml at the start and about 200 ml at the end.

The spacer member may comprise a hollow member which forms the recess in the second piston which engages with the projection on the first piston to couple the first and second pistons together.

The second lower piston may comprise a lower cylindrical portion having an external diameter less than the internal diameter of the container wall, thereby forming an annular clearance between the cylindrical portion and the container wall. Preferably the annular clearance is less than 1 mm. Preferably the annular clearance is greater than 0.1 mm.

The lower cylindrical portion may comprise a wall engaging skirt.

The first upper lower piston may comprise an upper cylindrical portion which abuts against the inside wall of the container.

The upper cylindrical portion may comprise a wall engaging skirt.

Specific embodiments of the invention will now be described, by way of example only, with reference to the accompanying drawings in which.

Figure 1:
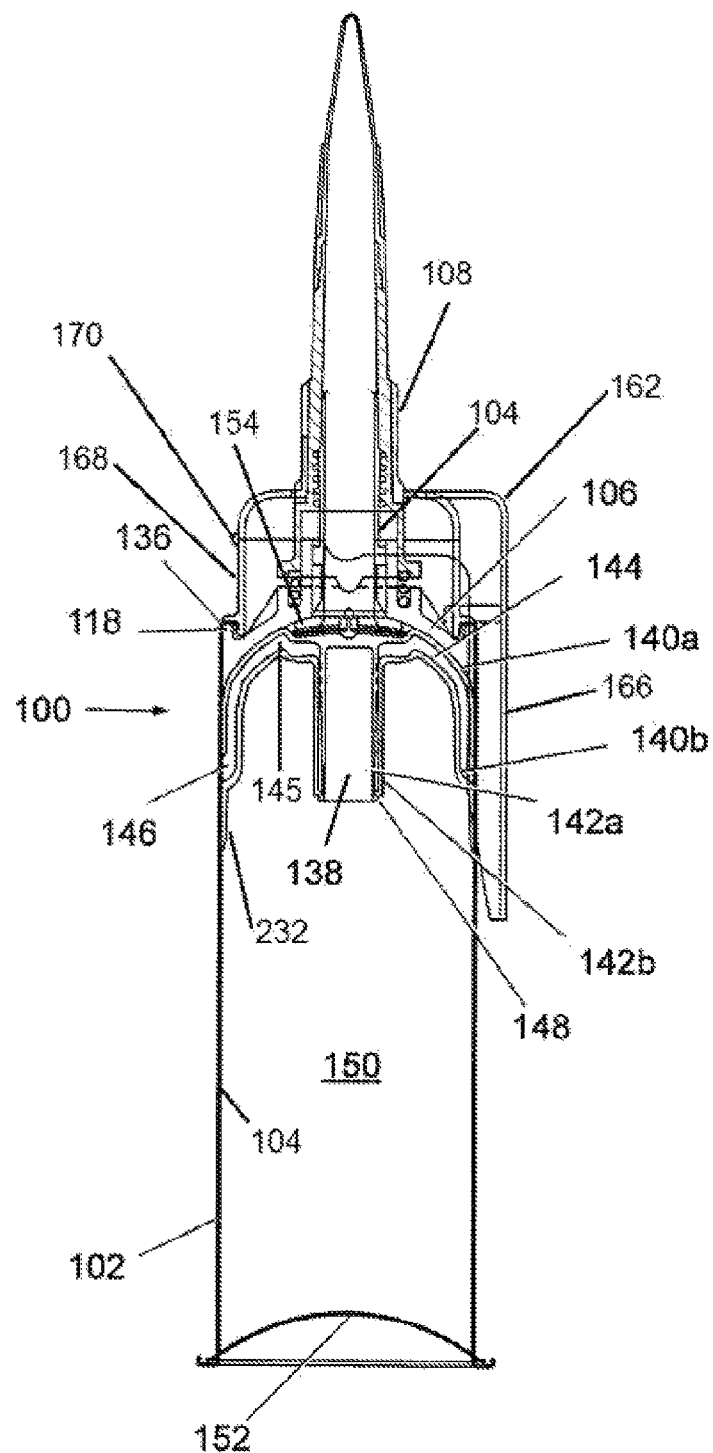
FIG. 1 is a side view in cross-section of a pressure pack dispenser in accordance with an embodiment of the present invention.

Referring firstly to FIG. 1 of the accompanying drawings, apparatus in accordance with an embodiment of the present invention will be described. The apparatus will be referred to hereinafter as a "pressure pack dispenser", "pressure pack" or "pack". The pressure pack dispenser of FIG. 1 is generally denoted 100.

The pack 100 consists generally of a canister section and a valve section. In this example, the canister section comprises a standard preformed cylindrical can 102 which is internally lacquered. It is envisaged that the can 102 could be a tin plate can having a bore in the top. Alternatively the can 102 could be manufactured from aluminium.

The pack 100 is automatically assembled as follows. Firstly a sub-assembly is formed from a valve portion 104, a boss 106 and an actuator 108. The sub-assembly does not form part of the present invention, and is described in more detail in from WO 99/18010.

The valve portion 104 is a substantially hollow cylindrical tube, provided with a screw thread on its exterior surface. The valve portion 104 is open at one end and is provided with, in this example, four ports around its exterior surface. The valve portion 104 is an outlet through which product is dispensed.

The boss 106 is a substantially hollow cylinder with a large flange portion at one end. The valve portion 104 fits snugly within the hollow of the boss 106. The actuator 108 is a moulded plastic component having a hollow cylindrical interior and a stepped exterior surface. Following insertion of the valve portion 104 into the boss 106 (and clicking into place) the actuator 108 is placed over the end of the valve portion 104 and screwed onto it by means of cooperation of screw threads to complete the sub-assembly.

The sub-assembly is then inserted up the inside of the can 102 until the flange 118 provided on the boss 106 fits into a curled lip 136 at the top of the can 102. This limits further movement of the boss 106. The boss 106 should be a friction fit within the can 102, thereby sealing the end of the can 102. However, if necessary the neck of the can 102 may be crimped below the boss 106 to hold the sub-assembly in place.

Following insertion of the sub-assembly, a composite piston 138 is inserted into the can 102. The composite piston 138 comprises interlocking first and second pistons 140a, 140b, each having a stem portion 142a, 142b in its centre. The first and second pistons 140a, 140b, also referred to as upper and lower pistons, lock together and a cavity or chamber 144 is formed between them.

The outer surface of the composite piston 138 is in sliding contact with the internal surface of the can 102. The chamber 144 is filled with a measured quantity of sealant 145 to form a pressure seal. The sealant 145 not only fills the chamber 144, but also fills the annular space 146 in contact with the internal surface of the can 102.

The composite piston 138 is formed by squirting sealant (in this case a glycerine and starch mix) into the first piston 140a, then allowing the sealant to cool and placing the second piston 140b onto the first piston 140a. This is done prior to insertion of the composite piston 138 into the can 102. As the second piston 140b is fitted into the first piston 140a, the sealant is displaced within the cavity 144 formed between them. There is a minor "click" at this stage as the first and second pistons 140a, 140b engage each other. Then the piston assembly 138 is rammed up the can 102 to the boss 106 and as this occurs the two pistons 140a, 140b are forced together. There is another "click" as the pistons 140a, 140b then lock together by means of a clip mechanism 148 on the stems 142a, 142b. At this second click the sealant is displaced into the annular ring 146 to form a propellant-tight seal. Other methods of interlocking the pistons and/or introducing the sealant are envisaged.

A clearance is provided between the second lower piston 140b and the cylindrical container wall 104. Typically this clearance is between 0.1 mm and 1.0 mm. In the example the clearance occurs between the container wall 104 and a lower cylindrical portion 232 of the lower piston 140b forming a wall engaging skirt 232. The clearance is filled with the viscous sealant material 145 during movement of the composite piston 138 within the container 102 towards the outlet, which in this case comprises the valve portion 104. The viscosity of the viscous sealant material 145 and the dimension of the clearance are selected such that a thin film of viscous sealant material 145 is left on the container wall 104 of the propellant chamber 150 as the composite piston 138 moves within the container 102 towards the outlet 104. This has the effect of reducing the volume of viscous sealant material 145 in the piston sealant chamber 144 and reducing the friction force between the composite piston and the container wall, because the annular space 146 in contact with the internal surface of the can 102 is reduced in size. This effect is described in further detail with respect to the embodiment of FIGS. 9 and 10 below.

This piston arrangement offers several additional advantages. For example, the hollow stem 142b of the second piston 140b permits air to exit the space between the first and second pistons 140a, 140b, up to the time when they lock together. In a modification (not shown) the first piston could be provided with a central valve, to permit passage of air from above the piston assembly.

The propellant chamber 150 of the can 102 below the composite piston 138 is pressurised by introducing compressed gas under high pressure, typically 70 psi or more for a 47 mm diameter can, and an aerosol dome 152 forming the lower wall of the container is fitted, thereby sealing the pack 100. Any suitable compressible gas may be used, such as compressed air, nitrogen or carbon dioxide. At this stage, the pack 100 may be supplied to a customer (i.e. a product manufacturer) for filling, labelling and fitting of the nozzle and the lever mechanism described below. The product may be fixant, sealant, glue or the like. Alternatively, it could be a foodstuff such as cake icing, or a pharmaceutical, or a cosmetic product such as depilatory cream.

At this stage, it should be noted that a small air space 154 is left between the composite piston 138 and the valve 104. The airspace 154 is of a minimum size of 2 ml and is provided by shaping the crown of the upper piston 140a to fit the valve profile and the boss 106 leaving the required gap. Once the pack is pressurised, the increased pressure against the flap valve keeps it in the closed position.

Filling with product may be done by a manufacturer of the product at their own premises, and is carried out as described in WO 99/18010. Typically the product to be dispensed is introduced at a high pressure, for example at a pressure in excess of 200 psi if the propellant gas has been introduced at 70 psi). The product then begins to force the composite piston 138 down into the can 102 against the pressure of the propellant gas in volume 150. The piston assembly 138 is forced down the can 102 toward the dome 152. The filling continues until the required product fill is achieved or the composite piston 138 reaches the dome 152, whichever is sooner.

A lever cap 162 is placed over the protruding parts of the boss 106, the valve 104 and the actuator 108. In this example the lever cap 162 is moulded as a single piece of plastic and has a handle 166 and a base 168. The handle 166 is joined to the base 168 by means of a butterfly hinge 170.

The components of a preferred composite piston 138 will now be described with reference to FIGS. 2, 3 and 4.

The composite piston 138 comprises an assembly consisting of a primary or upper piston 200 and a secondary or lower piston 202. Both pistons 200, 202 are generally cup shaped, with stem portions 204, 206 in their centres. The pistons 200, 202 are designed to interlock with one another, by means of teeth 208 on the stem of the primary piston 200 and a flange 210 on the stem of the secondary piston 202, thereby defining a sealant chamber. In use, the sealant chamber is filled with sealant. In the piston assembly formed from pistons 200 and 202, approximately 7 g of sealant is required to fill the chamber. This compares favourably with over 30 g required to fill sealant chambers in known piston assemblies. This reduces costs involved in manufacture of packs incorporating the piston assembly of the present invention.

The second lower piston 202 is provided with a spacer member 230 which projects towards the lower end wall 152. When the composite piston 138 is in the full position, at the bottom of the container 102, the spacer member is in contact with the lower end wall 152. In the example of FIGS. 1 to 4 the spacer member comprises both the skirt 232 and the stem portion 206, since when the composite piston 232 is urged towards the lower end wall 152, both the skirt 232 and the stem portion 206 come into contact with the lower end wall 152. However the stem portion 206 could be longer so that only the stem portion 206 forms the spacer member 230 and comes into contact with the lower end wall 152. Alternatively the skirt 232 could be longer so that only the skirt 232 forms the spacer member 230 and comes into contact with the lower end wall 152. Alternatively the spacer member 230 can be formed separately as described below with reference to FIG. 5

The spacer member 230 serves to space the composite piston 138 from the lower end wall 152 to provide a minimum volume of the propellant chamber 150. Typically the minimum volume of the propellant chamber is at least 10% of the maximum volume of the propellant chamber 150, the maximum volume occurring when the composite piston is in the exhausted position and the composite piston 138 is adjacent to the outlet 104. This ensures that the pressure of the propellant gas, which falls as the propellant chamber 150 expands, does not fall below a level sufficient to urge the product out of the valve 104.

Figure 2:
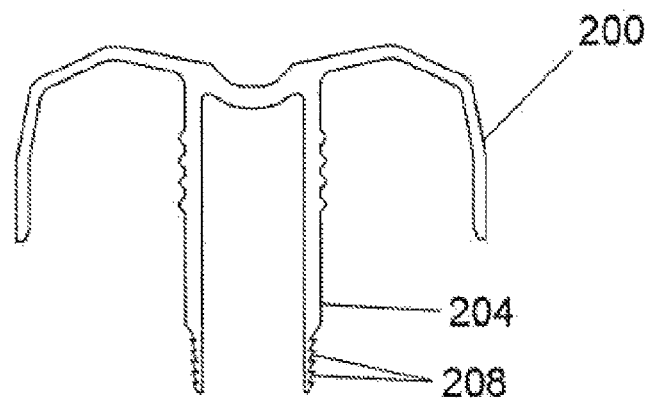
FIG. 2 is a view in cross-section of a first or primary upper piston of the composite piston of the dispenser of FIG. 1.
Figure 3:
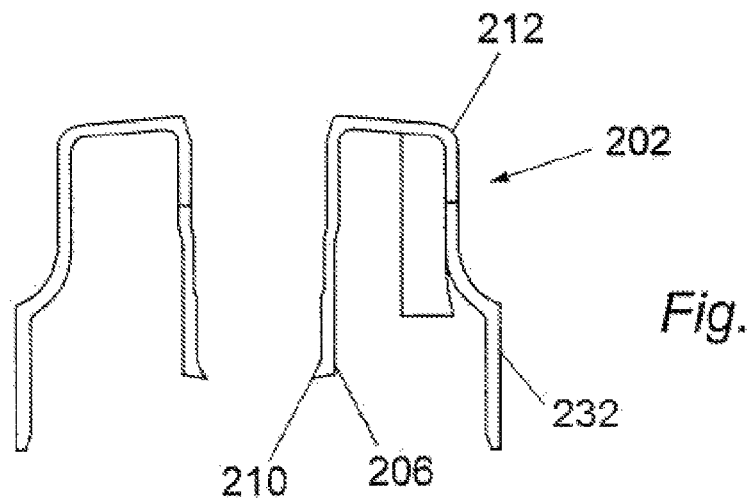
FIG. 3 is a view in cross-section of a second or secondary lower piston which cooperates with the primary piston of FIG. 2.
Figure 4:
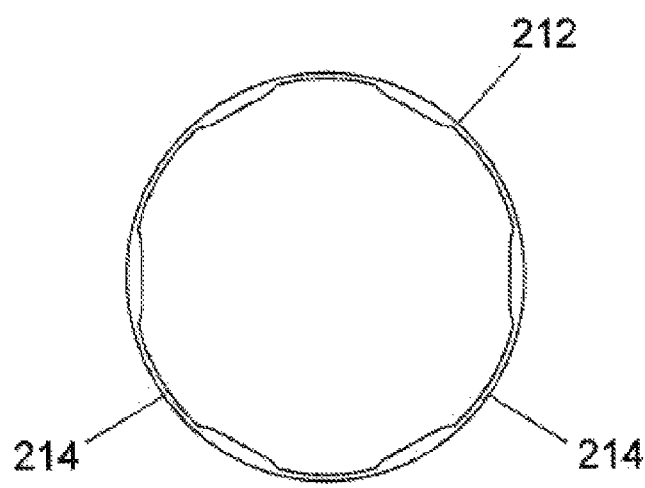
FIG. 4 is a plan view of the top part of the wall of the piston of FIG. 3, showing the relative thickness of each part of the wall.

The example composite piston 138 shown in FIGS. 2 to 4 has a further optional advantageous feature in that the top wall 212 of the secondary piston 202 is made from a flexible plastics material having a number of thin pocket sections 214 therein. These pockets 214 are designed to balloon on expansion of sealant within the sealant chamber (as occurs during storage of a filled pack), thereby accommodating the sealant and preventing the primary and secondary pistons from separating or becoming unlocked from one another. This is a significant advantage of the piston assembly of the present invention.

Figure 5:
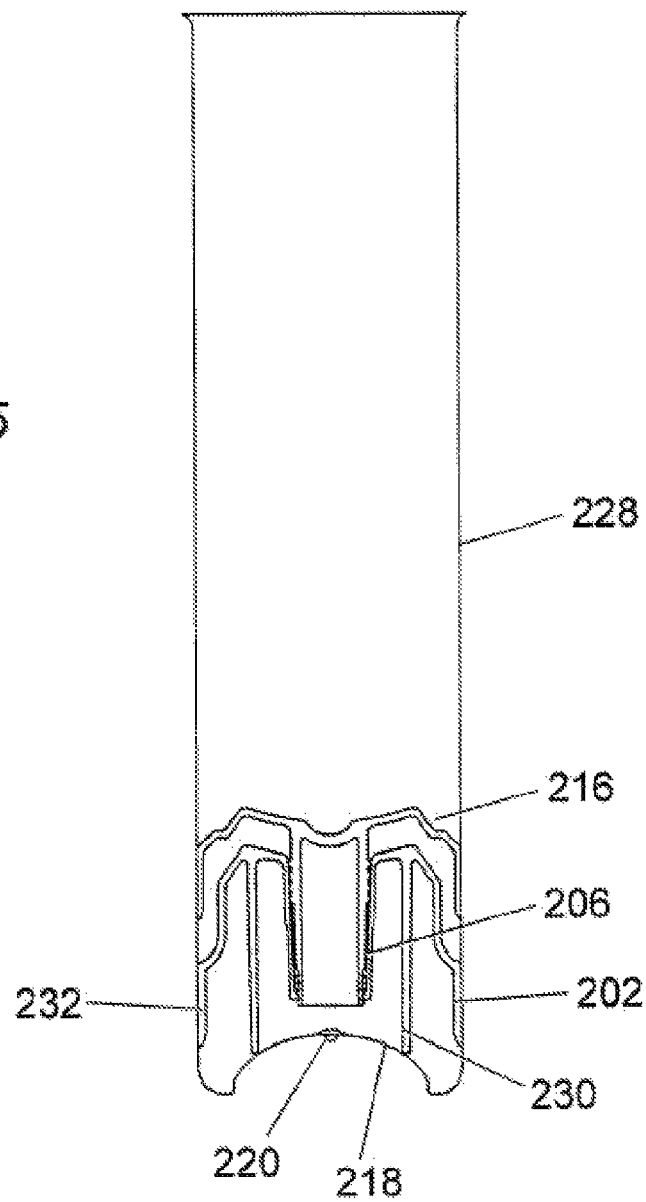
FIG. 5 is a side view in cross-section of a pressure pack dispenser in accordance with another embodiment of the present invention, suitable for "backward" filling.

Referring now to FIG. 5, there is shown a piston assembly 216 similar to that described above with reference to FIGS. 2 to 4, within a standard two piece aerosol can. This arrangement differs from that described earlier in that the can must be "backward filled" with the composite piston 216 and product to be dispensed, because the bottom end 218 is initially sealed apart from a small fill valve 220.

The valve assembly 222 of the pack of FIG. 5 and in particular the boss portion 224, is specially designed to fit snugly within the top piece 226 of the two piece can. The view of FIG. 5 shows the top piece 226 (with valve assembly 222 therein) just prior to fitting onto the can section 228. The valve assembly 222 is an outlet through which product is dispensed.

It should be noted that the boss portion 224 is only one of many possible fittings for the top piece 226. The top piece 226 is a standard open top cone and may, in other embodiments, have other valve assemblies fitted therein. For example, a standard aerosol valve such as a spray valve or tilt valve (for dispensing cream, etc) may be fitted. It should also be noted that the upper profile of the piston assembly may require modification to accommodate components of such valves which protrude into the body of the can. This may be achieved using the hollow stem of the secondary (uppermost) piston to make room for the valve components when the piston assembly is in its uppermost position.

In the embodiment of FIG. 5, the secondary piston 202 is introduced into the can first. The hollow stem 206 of the secondary piston 202 allows air to escape from the space between the piston 202 and the bottom 218 of the can when the piston 202 is being inserted. It will be noted that a cylindrical tube 230 is provided on the underside of the secondary piston 202, which serves as a spacer and contacts the base 218 of the can before the rest of the piston 202, thereby leaving a space between the outer skirt 232 of the piston 202 and the base 218 of the can. This provides a minimum volume for the propellant chamber. If the minimum volume is too small, there would not be sufficient mass of propellant gas to provide a sufficient pressure to dispense product when the composite piston 216 is near the top of the container.

Following the insertion of the secondary piston 202, the primary piston 200 (with sealant therein) is inserted into the can. As the primary piston 200 is forced down the can, air can escape from underneath the primary piston 200, through the hollow stem 206 of the other piston 200 and out through the valve 220 in the base 218 of the can. This air escape can take place up to the point where the pistons 200, 202 engage one another. Any remaining air trapped between the pistons can then travel down the sides of the secondary piston 202, (the pressure of the air temporarily collapsing the outer skirt 232), and through apertures (not shown) in the bottom of the tube 230 of the secondary piston 202, to eventually escape through the valve 220. The can is then ready to have the top piece 226 fitted. It should be noted that any top piece/valve assembly may be fitted depending on an end users requirements.

Figure 6:
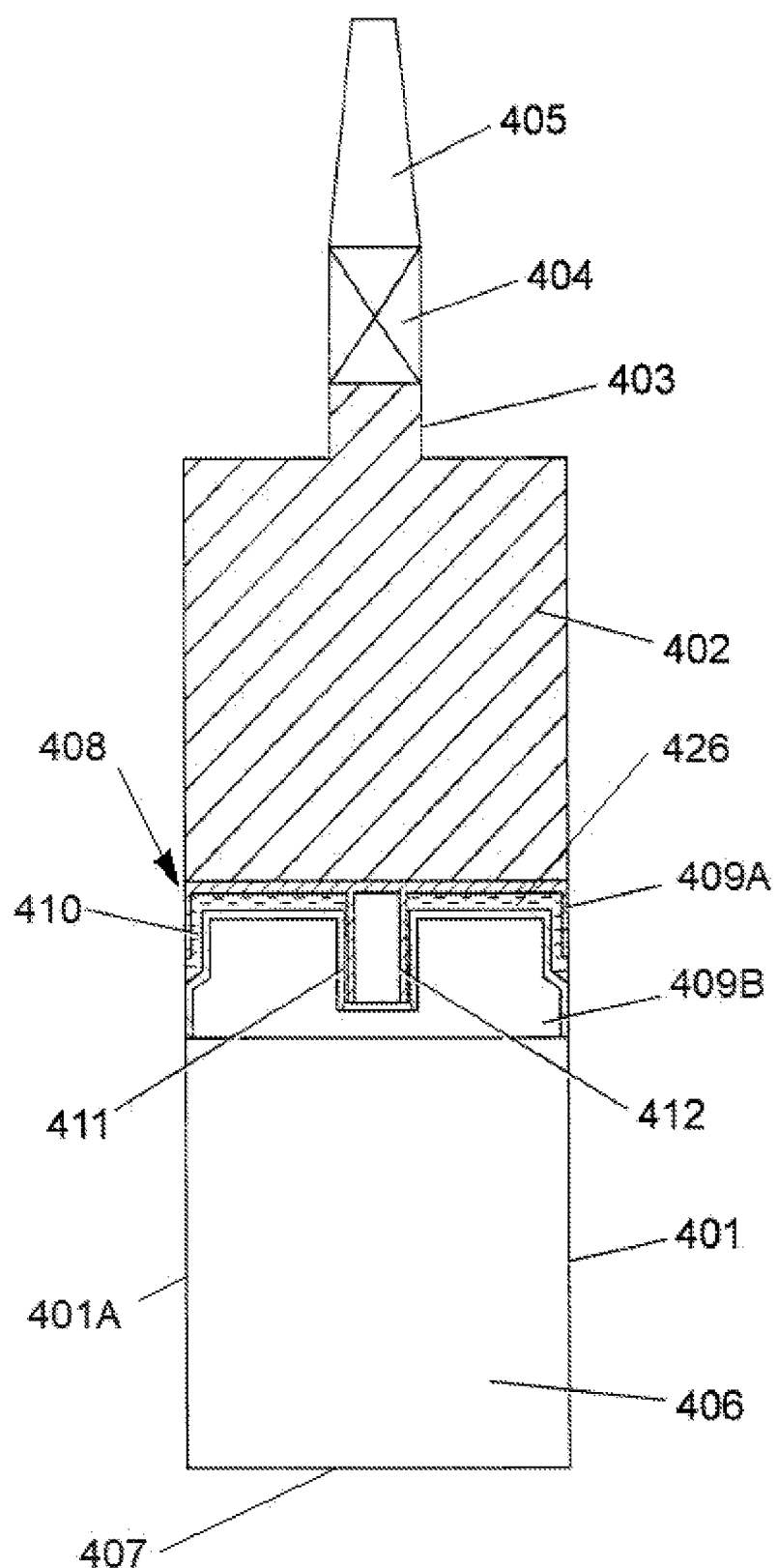
FIG. 6 is a cross-sectional view through a pressure pack dispenser in accordance with another embodiment of the invention.

The components of a piston assembly according to a further embodiment of the invention will now be described with reference to FIGS. 6 to 10. FIG. 6 shows a cross-sectional view through a container 401 which contains a product 402 which is to be dispensed through an outlet 403 in the container 401 to a valve 404 which controls dispensing of the product through a nozzle 405. The valve 404 which is attached to the outlet 403 by a screw thread and the nozzle 405 is attached to the valve 404 also by a screw thread. The container 401 has a tubular side wall 401A and a lower end wall 407.

Located within the container 401 is a composite piston 408 comprising two pistons 408, 409, an upper piston 409A and a lower piston 409B, between which a viscous material 410 is located in a sealant chamber 426. The pistons 409A, 409B and the viscous material 410 separate the product 402 from a propellant 406 in the container 401. The propellant may be any suitable propellant gas.

The pistons 409A, 409B are coupled to each other by a central tube section 412 on the piston 409A which engages with a central aperture 411 in the piston 409B. The pistons 409A, 409B are shown in more detail in FIGS. 7 and 8.

Figure 7:
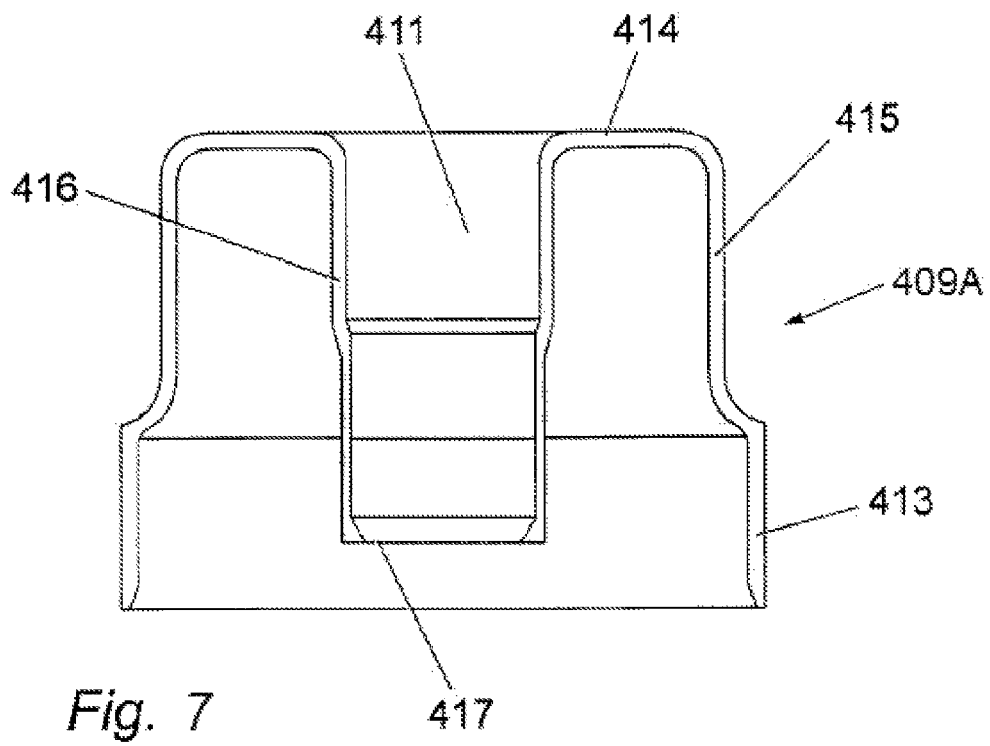
FIG. 7 is a cross-sectional view through a second or lower piston for use in the composite piston of the dispenser of FIG. 6.

FIG. 7 is a cross-sectional view of the lower piston 409B. The lower piston 409B has a skirt section 413 which contacts the inside surface of the wall of the container 401. The lower piston 409B also has an annular section 414 which is connected to the skirt section 413 by a side wall 415. A central tubular section 416 depends from the inside of the annular section 414 to define the central aperture 411. Located at the end of the tubular section 416, remote from the annular section 414, is a nibbed flange 417 which is directed towards the centre of the aperture 411. The portion of the tubular section 416 on which the flange 417 is located has a wall thickness less than the portion of the tubular section 416 adjacent the annular section 414 to enable the flange 417 to flex outwards.

Figure 8:
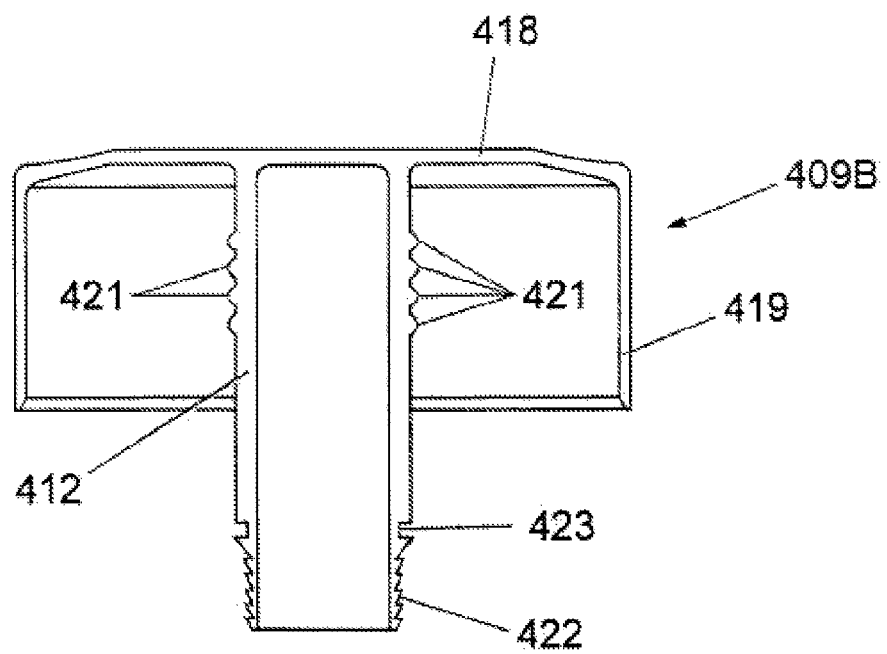
FIG. 8 is a cross-sectional view through a first or upper piston for use in the composite piston of the dispenser shown in FIG. 6.

FIG. 8 is a cross-sectional view of the upper piston 409A. The upper piston 409A has a central section 418 from which depends a skirt section 419 which engages with the inside wall of the container 401. Depending centrally from the central section 418 is the tube section 412 which has a number of ridges 421 adjacent the central section 418 and a ratchet portion 422 at the end of the tube section 412 remote from the central section 418. Next to the ratchet formations 422 is a groove 423 which extends circumferentially around the tube section 412.

In use, the section of upper piston 409A between the tube section 412 and the skirt 419 is filled with the viscous material 410. The tube section 412 is then inserted into the central aperture 411 in the upper piston 409A defined by the tubular section 416 until the ratchet formations 422 contact the flange 417. Further pushing together of the pistons 409A, 409B causes deflection of the flange 417 to engage in the ratchet formations 422. The ratchet formations are shaped such that the pistons 409A, 409B may be pushed together but they may not be easily separated after the flange 417 has engaged in the ratchet formations 422.

Ridges 421 frictionally engage with the internal side walls of the tubular section 416 and help prevent the viscous material passing between the tubular section 416 of the lower piston 409B and the tube section 412 of the upper piston 409A.

Figure 9:
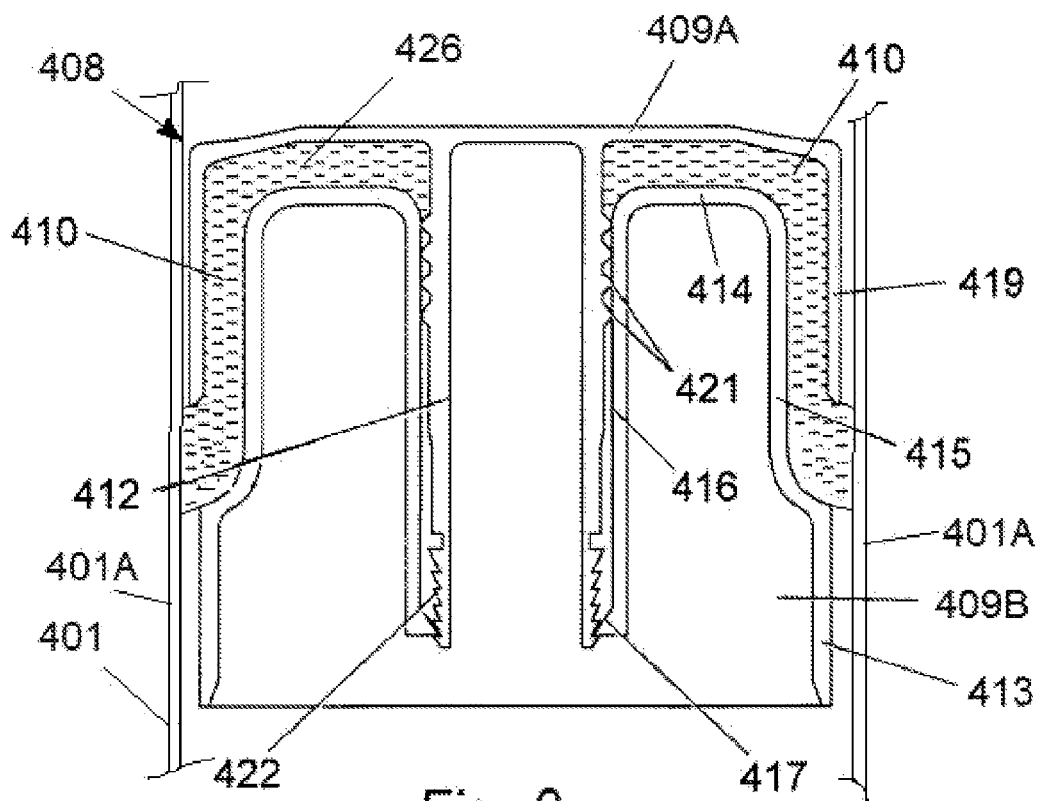
FIG. 9 is a cross-sectional view of the upper and lower pistons of FIGS. 7 and 8 coupled together in a spaced apart position.

The composite piston 408 formed by the pistons 409A, 409B and the viscous material 410, which is illustrated in FIG. 9, may then be inserted into the container 401 and used as shown in FIG. 6.

FIG. 9 shows the composite piston 409 in a first full position adjacent the lower end wall 407. In this position the product chamber 402 has its greatest volume. The viscous sealant material 405 is urged against the side wall 401A of the container 401. Some material is urged between the skirt section 419 of the upper piston 409A and the side wall 401A, where it is prevented from extending past the upper piston 409A by the presence of the product 402 to be dispensed. The sealant 405 serves as a lubricant, to reduce friction between the upper skirt 419 and the container wall 401A.

As the product is dispensed and the composite piston 408 moves up the container 401, sealant material 405 is urged into the gap formed by the clearance between the skirt section 413 of the lower piston 409B and the side wall 401A. The viscosity of the viscous sealant material 405 and the clearance between the skirt section 413 of the lower piston 409B and the side wall 401A are selected such that a thin film of viscous sealant material 410A is left on the container wall 401A of the propellant chamber 406 as the composite piston 408 moves within the container towards the outlet 403, thereby reducing the volume of viscous sealant material 410 in the piston sealant chamber and reducing the friction force between the composite piston 408 and the container wall 401A.

Typically the clearance between the upper skirt 419 and the container wall 401A is between 0.1 mm and 1.0 mm. Typically the clearance between the lower skirt 413 and the container wall 401A is between 0.1 mm and 2.0 mm. Typically the viscosity of the sealant is in the range 50 to 4000 poise, measured at 20° C.

The mutually engaged flange 417 and ratchet formations 422 mitigate the possibility of the pistons 409A, 409B separating due to propellant 406 entering the viscous material 410 between the pistons 409A, 409B and pushing the pistons 409A, 409B apart which may compromise the effectiveness of the composite piston in mitigating the possibility of the propellant 406 leaking into the product 402.

Figure 10:
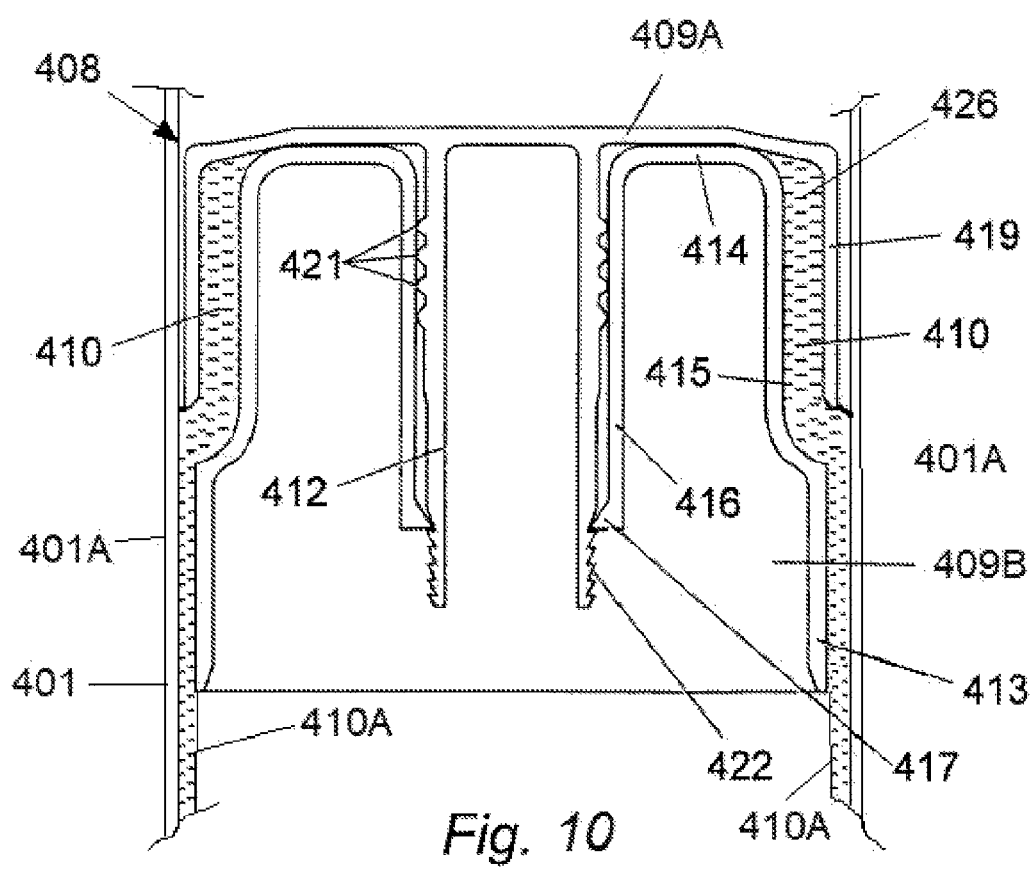
FIG. 10 is a cross-sectional view of the upper and lower pistons of FIGS. 7 and 8 coupled together in a closed position.

However, the pistons 409A, 409B are permitted to move towards each other to ensure that the viscous sealant material is pressed against the inside wall of the container, and to ensure that the sealant 410 is urged past the lower skirt 413 to form the thin film of viscous sealant 410A. As the thin film is extruded, the flange 417 can move further up the ratchet formations 422 until the annular section 414 butts against the central section 418, as shown in FIG. 10. In practice the annular section 414 may not butt directly against the central section 418 when the composite piston 408 is in the exhausted position, adjacent to the outlet 6 403, and some sealant 410 may remain in the sealant chamber 426.

The presence of the viscous material 410 on the inside wall of the container reduces the frictional forces between the wall engaging skirts 413, 417 and helps to give a smooth movement of the pistons 409A, 409B within the container 401. In addition or alternatively, the viscous material 410 may also be used as a sealing material to help prevent components of the product permeating either through the pistons 409A, 409B or between the wall engaging skirts 413, 417 and the inside wall of the container 401.

In the example shown in FIG. 6, the pistons are pushed towards the outlet 403 by the propellant 406 when the valve 404 is opened by a user. This causes the product 402 to exit the outlet 403, pass through the valve 404 and pass out through the nozzle 405.

It is to be understood that the containers according to the invention may be filled from the bottom, if required, by providing a separate domed base which is sealed to the container after insertion of the product and the composite piston.

The packs described have significant advantages over and above known packs since they do not require a liquid propellant, and may be used in circumstances where the use of liquid propellants is restricted or prohibited. The combination of a sealant in the composite piston of a suitable viscosity and a small clearance between the lower piston and the container wall means a trace of sealant is left on the container wall as the composite piston is urged towards the outlet. This in turn results in a decrease in the amount of sealant in the sealant chamber. It has been found that this decrease in the amount of sealant results in a decrease in the piston frictional forces between the composite piston and the container wall. These decreased frictional forces, in combination with the decreased friction forces arising from the reduced amount of product in the product chamber as the composite piston rises, are sufficient to substantially balance the decrease in the force acting on the lower piston from the propellant gas as the volume of the propellant gas increases and the pressure of the propellant gas decreases.

This enables the pressure pack of the present invention to achieve a substantially constant flow of product through the dispensing nozzle, even as the propellant pressure decreases.

Figure 11:
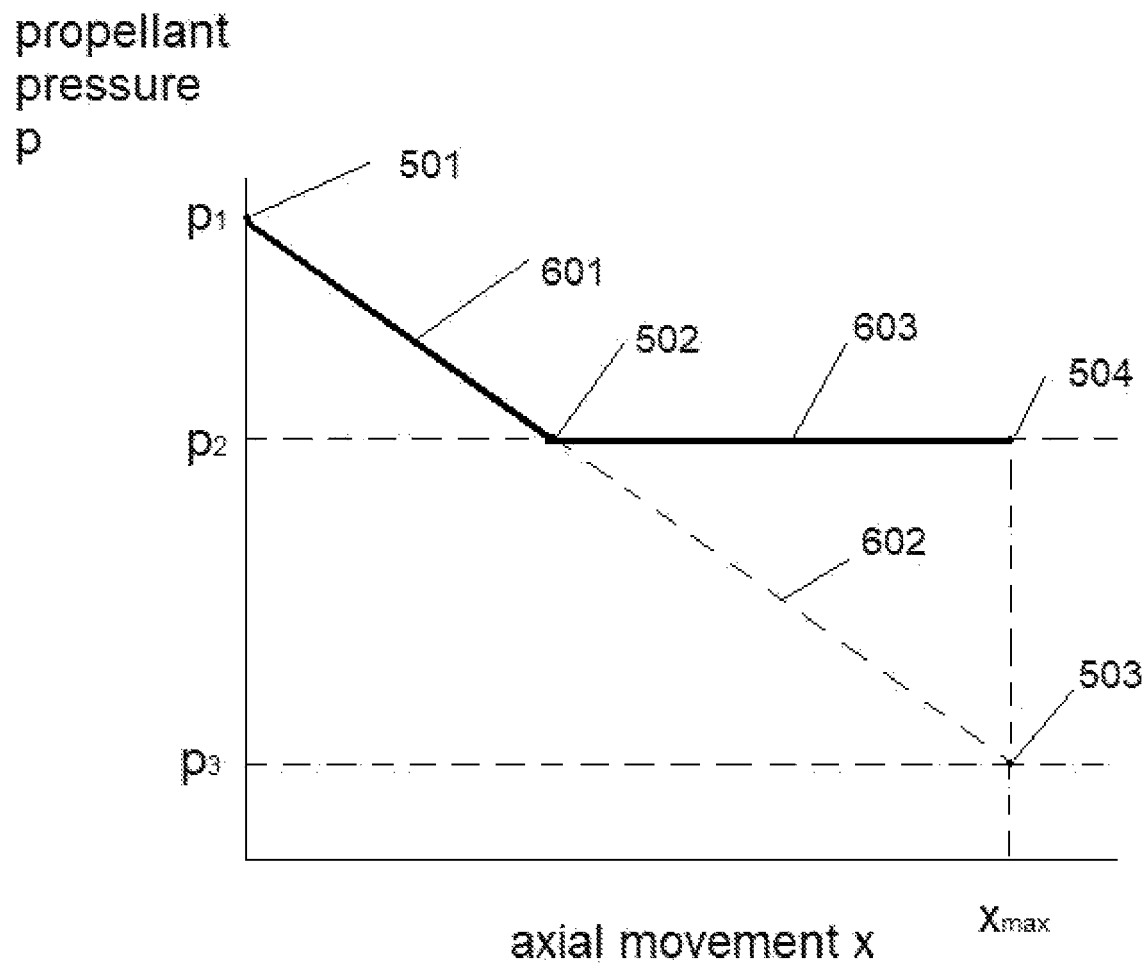
FIG. 11 shows the relationship between propellant pressure and displacement of a pressure pack dispenser in accordance with an embodiment of the present invention.

In a further embodiment of the invention, instead of using only a compressed gas which remains in the gaseous phase as the piston moves from the first position to the second position, such as air, nitrogen, nitrous oxide and carbon dioxide or other suitable gas, as a propellant, a mixture of a compressed gas which remains in the gaseous phase and a liquid propellant may be used. With some more viscous product it may be difficult to provide sufficient pressure over the full extent of axial travel of the composite piston 409, from the first full position to the second exhausted position. In such circumstances the high pressure of the compressed gas in the first stage of travel, when the propellant chamber is smaller, may be combined with the constant pressure of a liquid propellant, particularly a hydrocarbon propellant, in the second stage of travel, when the propellant chamber is larger and the partial pressure from the compressed gas is reduced. This effect is illustrated in FIG. 11, which shows the variation in pressure in the propellant chamber 406 during the axial movement x of the composite piston 408 from the first full position, where the axial movement x is zero, to the second exhausted position, where the axial movement x is a maximum $x_{max}$. At point 501, when the composite piston 408 is in the first full position, the partial pressure from the compressed gas is a maximum pressure $p_1$. This pressure $p_1$ is greater than the vapour pressure $p_2$ of the liquid propellant.

If no liquid propellant were present, then the pressure in the propellant chamber would decrease from the maximum pressure $p_1$ as the axial movement increases, along line 601 to point 502, then further along line 602 to a minimum pressure $p_3$ at point 503. However the presence of the liquid propellant means that when the pressure of the compressed gas falls to $p_2$ at point 502, the liquid propellant starts to vapourise. Further axial movement of the composite piston 408 results in further liquid propellant vapourising to fill the increasing size of the propellant chamber, and maintaining the pressure in the propellant chamber at $p_2$, the vapour pressure of the liquid propellant. Provided that there is sufficient liquid propellant, the pressure in the propellant chamber is maintained at pressure $p_2$ from point 502, along line 603 to point 504, when the composite piston 408 is in the second exhausted position.

The use of a mixture of compressed gas which remains in the gaseous phase and a liquid propellant offers a number of advantages over the prior art use of a liquid propellant only.

Firstly, it is not necessary to use a liquid propellant which has such a high vapour pressure, because when the chamber is full and the resistance from the product is to be dispensed is greatest, use is made of the partial pressure arising from the compressed gas. A number of liquid propellants having a high vapour pressure are among the propellants which are of greatest environmental concern, so there is a real advantage in reducing use of these propellants.

Secondly the quantity of liquid propellant needed is reduced, because vapourisation of the liquid propellant is only required over a proportion of the travel of the composite piston. For example, if point 502 in FIG. 11 is at the half way point of the axial movement x, then the pressure pack requires a mass of liquid propellant which is only 50% of the mass required if liquid propellant were used alone, with compressed gas. This offers both cost savings and environmental advantages.

In a further embodiment of the invention the viscous sealant material 410 comprises a mixture of glycerine or an equivalent liquid barrier material and starch or an equivalent filler material, having a viscosity of less than 100 poise, preferably less than 50 poise, at 100° C., and a viscosity of less than 4000 poise, preferably less than 2000 poise, at 20° C.

It is of particular benefit to have a viscosity which is substantially less at 100° C. than at 20° C. The composite piston 408 is typically assembled at a temperature of about 100° C., so that the sealant 410 is less viscous. In one possible means of assembly, before the valve assembly is fixed, the lower piston 409B is inserted into the container, sealant is injected into the upper piston 409A and the upper piston is inserted into the container onto the lower piston. To enable the sealant to flow evenly around the sealant chamber 426 it must flow sufficiently freely. The assembly may be carried out at 100° C. without damaging the component parts of the composite piston 48, which are typically of moulded plastic.

In practice the sealant may be dispensed into the composite piston at a temperature of about of between 80° C. and 100° C., typically about 90° C.

The inventors have found that an optimum viscosity is achieved by a composition of viscous sealant material which comprises between 40% and 90%, preferably between 50% and 85% glycerine by mass, and between 10% and 60%, preferably between 15% and 50% starch by mass.

This particular composition gives a viscous sealant material which has sufficient thermal mass to retain its heat, and therefore its flowability, during the assembly process.

In a first example, a pressure pack dispenser according to the present invention was prepared with a sealant comprising 50% glycerine by mass and 50% starch by mass. The mixture was prepared by heating the glycerine to 80° C. then adding the starch. The mixture was then heated to 145° C. and mixed thoroughly. The mixture was then stored and transported at room temperature. During assembly of the piston the mixture was heated to 100° C., when its viscosity was measured to be 12 poise, and then dispensed into the composite piston at 90° C., when its viscosity was measured to be 20 poise.

Upon cooling to room temperature at 20° C. its viscosity was measured to be 3200 poise, but this reduced to 480 poise at 50° C.

This sealant gave satisfactory results, producing an even flow of product with compressed nitrogen as a propellant. In a first example, a pressure pack dispenser according to the present invention was prepared with a sealant comprising 50% glycerine by mass and 50% starch by mass. The mixture was prepared by heating the glycerine to 80° C. then adding the starch. The mixture was then heated to 145° C. and mixed thoroughly. The mixture was then stored and transported at room temperature. During assembly of the piston the mixture was heated to 100° C., when its viscosity was measured to be 12 poise, and then dispensed into the composite piston at 90° C., when its viscosity was measured to be 20 poise.

Upon cooling to room temperature at 20° C. its viscosity was measured to be 3,200 poise, but this reduced to 480 poise at 50° C.

This sealant performs satisfactorily with a mixture of compressed air and a hydrocarbon liquid propellant as the propellant with a relatively low starting pressure of about 10 Bar (145 psi) and silicon sealant as a product. It also performs satisfactorily with compressed air only as the propellant with a higher starting pressure of up to about 15 Bar (217 psi) and silicon sealant as a product.

In a second example, a pressure pack dispenser according to the present invention was prepared with a sealant comprising 85% glycerine by mass and 15% starch by mass. The mixture was prepared by heating the glycerine to 80° C. then adding the starch. The mixture was then heated to 145° C. and mixed thoroughly. The mixture was then stored and transported at room temperature. During assembly of the piston the mixture was heated to 100° C., when its viscosity was measured to be 2.5 poise, and then dispensed into the composite piston at 90° C., when its viscosity was measured to be 4.2 poise.

Upon cooling to room temperature at 20° C. its viscosity was measured to be 1100 poise, but this reduced to 78 poise at 50° C.

This sealant performs satisfactorily with compressed air only as the propellant with a medium starting pressure of about 10 to 12 Bar (145 to 174 psi) and silicon sealant as a product.

Modifications and improvements may be made to the foregoing without departing from the scope of the invention.

The invention claimed is:

1. A pressure pack dispenser for dispensing a product comprising:

a container for dispensing a product therefrom, the container comprising a cylindrical container wall, a lower end wall, and a product outlet through which the product is dispensed, and a composite piston movably mounted within the container and adapted to move from a first position adjacent the lower end wall to a second position adjacent the outlet, the composite piston comprising a first upper piston, a second lower piston and a coupling means, the coupling means movably coupling the first and second pistons to each other and permitting limited relative axial movement between the first and second pistons, the axial movement being in a longitudinal direction parallel to the direction of movement of the composite piston, the container wall and the first upper piston defining a product chamber within the container, whereby movement of the composite piston within the container towards the outlet expels product through the outlet, the container wall and the second lower piston defining a propellant chamber containing a pressurised propellant, wherein the composite piston comprises a viscous sealant material located in a piston sealant chamber between the first and second pistons and adapted to be forced into engagement with the container wall by a compression force which acts between the first and second pistons to cause the second piston to move towards the first piston, characterised in that:

the pressurised propellant comprises a compressed gas which remains in the gaseous phase as the piston moves from the first position to the second position, and a clearance is provided between the second lower piston and the container wall which is filled with the viscous sealant material during movement of the composite piston within the container towards the outlet, the viscosity of the viscous sealant material and clearance being selected such that a thin film of viscous sealant material is left on the container wall of the propellant chamber as the composite piston moves within the container towards the outlet, thereby reducing the volume of viscous sealant material in the piston sealant chamber and reducing the friction force between the composite piston and the container wall.

2. The pressure pack dispenser of claim 1, wherein the pressurised propellant comprises only a compressed gas which remains in the gaseous phase as the piston moves from the first position to the second position.

3. The pressure pack dispenser of claim 1, wherein the pressurised propellant comprises a mixture of a compressed gas which remains in the gaseous phase as the piston moves from the first position to the second position and a liquid propellant.

4. The pressure pack dispenser of claim 1, wherein the compressed gas is selected from air, nitrogen, nitrous oxide and carbon dioxide.

5. The pressure pack dispenser of claim 1, wherein the first position of the composite piston is a full position in which the composite piston is at a position furthest from the outlet and the product chamber has a greatest volume, and wherein the second position of the composite piston is an exhausted position in which the composite piston is at a position closest to the outlet and the propellant chamber has a greatest volume.

6. The pressure pack dispenser of claim 1, wherein the second piston is adapted to move towards the first piston as the composite piston moves within the container towards the outlet.

7. The pressure pack dispenser of claim 1, wherein the piston sealant chamber is open circumferentially.

8. The pressure pack dispenser of claim 1, wherein the coupling means comprises a projection on one of the first and second pistons which engages with a recess in the other of the first and second pistons to couple the first and second pistons together.

9. The pressure pack dispenser of claim 8, wherein the projection is a central projection projecting in the longitudinal direction from one of the first and second pistons.

10. The pressure pack dispenser of claim 8, wherein the recess is a central aperture provided in the other of the first and second pistons.

11. The pressure pack dispenser of claim 8, wherein the projection and the recess include mutually engageable ratchet formations which permit movement of the pistons relative to each other towards each other only.

12. The pressure pack dispenser of claim 1, wherein the second lower piston is provided with a spacer member which projects towards the lower end wall and, when the composite piston is in the first position, serves to space the composite piston from the lower end wall to provide a minimum volume of the propellant chamber.

13. The pressure pack dispenser of claim 12, wherein the minimum volume of the propellant chamber is at least 10% of the maximum volume of the propellant chamber, the maximum volume occurring when the composite piston is in the second exhausted position.

14. The pressure pack dispenser of claim 1, wherein the second lower piston comprises a lower cylindrical portion or skirt having an external diameter less than the internal diameter of the container wall, thereby forming an annular clearance between the cylindrical portion and the container wall of between 0.1 mm and 1 mm.

15. A pressure pack dispenser for dispensing a product comprising:

a container for dispensing a product therefrom, the container comprising a cylindrical container wall, a lower end wall, and a product outlet through which the product is dispensed, and a composite piston movably mounted within the container and adapted to move from a first position adjacent the lower end wall to a second position adjacent the outlet, the composite piston comprising a first upper piston, a second lower piston and a coupling means, the coupling means movably coupling the first and second pistons to each other and permitting limited relative axial movement between the first and second pistons, the axial movement being in a longitudinal direction parallel to the direction of movement of the composite piston, the container wall and the first upper piston defining a product chamber within the container, whereby movement of the composite piston within the container towards the outlet expels product through the outlet, the container wall and the second lower piston defining a propellant chamber containing a pressurised propellant, wherein the composite piston comprises a viscous sealant material located in a piston sealant chamber between the first and second pistons and adapted to be forced into engagement with the container wall by a compression force which acts between the first and second pistons to cause the second piston to move towards the first piston, wherein the composite piston is arranged to travel from a first full position when the composite piston is at a position furthest from the outlet and the product chamber has a greatest volume to a second exhausted position when the composite piston is at a position closest to the outlet and the propellant chamber has a greatest volume, characterised in that:

the pressurised propellant is a mixture of a liquid propellant and a compressed gas, and in the first full position the mixture of a liquid propellant and a compressed gas is at a pressure greater than a vapour pressure of the liquid propellant, and the compressed gas is in a gaseous phase.

16. The pressure pack dispenser of claim 15, wherein in the second exhausted position the mixture of a liquid propellant and a compressed gas are at a pressure equal to the vapour pressure of the liquid propellant.

17. The pressure pack dispenser of claim 15, wherein the liquid propellant is a hydrocarbon.

18. The pressure pack dispenser of claim 15, wherein the liquid propellant has a vapour pressure of between 2.0 Bar and 7.0 Bar at 20° C.

19. The pressure pack dispenser of claim 15, wherein the compressed gas is selected from air, nitrogen, nitrous oxide and carbon dioxide.

20. The pressure pack dispenser of claim 15, wherein the liquid propellant is selected from 1,3,3,3-Tetrafluoropropene, 1,1,1,2-Tetrafluoroethane, 1,1,1,2,3,3,3-Heptafluoropropane and other suitable hydrocarbons or fluorinated hydrocarbons.

21. The pressure pack dispenser of claim 15, wherein the liquid propellant has a vapour pressure of between 2.0 Bar and 5.1 Bar at 20° C.

22. A pressure pack dispenser for dispensing a product comprising:

a container for dispensing a product therefrom, the container comprising a cylindrical container wall, a lower end wall, and a product outlet through which the product is dispensed, and a composite piston movably mounted within the container and adapted to move from a first position adjacent the lower end wall to a second position adjacent the outlet, the composite piston comprising a first upper piston, a second lower piston and a coupling means, the coupling means movably coupling the first and second pistons to each other and permitting limited relative axial movement between the first and second pistons, the axial movement being in a longitudinal direction parallel to the direction of movement of the composite piston, the container wall and the first upper piston defining a product chamber within the container, whereby movement of the composite piston within the container towards the outlet expels product through the outlet, the container wall and the second lower piston defining a propellant chamber containing a pressurised propellant, wherein the composite piston comprises a viscous sealant material located in a piston sealant chamber between the first and second pistons and adapted to be forced into engagement with the container wall by a compression force which acts between the first and second pistons to cause the second piston to move towards the first piston, characterised in that:

the pressurised propellant comprises a compressed gas which remains in a gaseous phase as the piston moves from the first position to the second position, the viscous sealant material comprises a mixture of glycerine or an equivalent liquid barrier material and starch or an equivalent filler material, the viscous sealant material has a viscosity of less than 100 poise at 100° C., and the viscous sealant material has a viscosity of less than 4000 poise at 20° C.

23. The pressure pack dispenser of claim 22, wherein the viscous sealant material comprises between 50% and 85% glycerine by mass and between 15% and 50% starch by mass.

24. The pressure pack dispenser of claim 22, wherein the pressurised propellant comprises only a compressed gas which remains in the gaseous phase as the piston moves from the first position to the second position.

25. The pressure pack dispenser of claim 22, wherein the pressurised propellant comprises a mixture of a compressed gas which remains in the gaseous phase as the piston moves from the first position to the second position and a liquid propellant.

26. The pressure pack dispenser of claim 22, wherein the compressed gas is selected from air, nitrogen, nitrous oxide and carbon dioxide.

* * * * *